US006109203A

United States Patent [19]
Mears

[11] Patent Number: 6,109,203
[45] Date of Patent: Aug. 29, 2000

[54] DEPLOYABLE PERSONAL LOCATOR DEVICE

[75] Inventor: Arthur William Mears, Erie, Colo.

[73] Assignees: Harold D. Sorensen, Lafayette; Tony Mears, Longmont, both of Colo.

[21] Appl. No.: 09/047,536

[22] Filed: Mar. 25, 1998

Related U.S. Application Data

[60] Provisional application No. 60/051,742, Jul. 3, 1997.

[51] Int. Cl.[7] .......... B64B 1/58
[52] U.S. Cl. .......... 116/210; 116/16.8
[58] Field of Search .......... 116/210, 209, 116/DIG. 8, DIG. 9; 244/31, 33, 98; 40/214, 215, 412; 446/220, 221, 222, 224, 225, 226; 441/9, 30, 40, 41, 92, 93, 96

[56] References Cited

U.S. PATENT DOCUMENTS

| | | | |
|---|---|---|---|
| 827,350 | 7/1906 | Crofford . | |
| 1,836,495 | 12/1931 | Paulson . | |
| 2,395,006 | 2/1946 | Leslie . | |
| 2,629,115 | 2/1953 | Hansen . | |
| 2,646,019 | 7/1953 | Chetlan . | |
| 2,842,090 | 7/1958 | Samwald . | |
| 2,862,531 | 2/1958 | Walker . | |
| 3,154,050 | 10/1964 | Hanson . | |
| 3,187,712 | 6/1965 | Pritchard et al. . | |
| 3,381,655 | 5/1968 | Rozzelle . | |
| 3,395,877 | 8/1968 | MacFadden et al. . | |
| 3,727,229 | 4/1973 | Clinger et al. . | |
| 3,735,723 | 5/1973 | Lutz . | |
| 3,796,181 | 3/1974 | Collins . | |
| 3,941,079 | 3/1976 | McNeill . | |
| 4,295,438 | 10/1981 | Porter . | |
| 4,696,252 | 9/1987 | Grill | 116/210 |
| 4,697,706 | 10/1987 | Schaller . | |
| 4,800,835 | 1/1989 | Mears | 116/210 |
| 4,815,677 | 3/1989 | Rushing et al. | 116/210 |
| 4,836,128 | 6/1989 | Walker | 116/DIG. 9 |
| 5,555,839 | 9/1996 | Staten et al. | 116/210 |
| 5,582,127 | 12/1996 | Willis et al. | 116/210 |

*Primary Examiner*—Andrew H. Hirshfeld
*Attorney, Agent, or Firm*—Rick Martin; Patent Law Off of Rick Martin, P.C.

[57] ABSTRACT

A locator device used to provide location information for a user. The device comprises a case containing a deflated airfoil and an inert gas cylinder. The inert gas flows into the airfoil upon puncture of the cylinder by a valve having a puncture valve. The valve is operated by a twist from a user. The twist of the valve causes the puncture valve to be driven into the gas cylinder, thereby puncturing the gas cylinder. The gas flows into the airfoil until it is fully inflated. The inflation of the airfoil automatically pulls a pin from a quick-release assembly thereby allowing the airfoil to be released and deployed upon full inflation. The airfoil is anchored to the area of the user by attachment to the invention. All of the invention's elements are contained within a case having easily separable halves.

21 Claims, 7 Drawing Sheets

DEPLOYABLE PERSONAL LOCATOR DEVICE

CROSS REFERENCE TO RELATED APPLICATIONS

Applicant claims the benefit of U.S. Provisional Application Ser. No. 60/051,742 filed Jul. 3 1997.

FIELD OF INVENTION

The present invention relates to the field of devices designed to automatically inflate an airfoil or balloon to help rescuers locate a user.

BACKGROUND OF THE INVENTION

There are numerous devices available which are designed to deploy a balloon to provide rescue location information for searchers to locate a user.

Most all of the devices are cumbersome or inoperable by a child. Porter, U.S. Pat. No. 4,295,438 requires an individual to be sufficiently strong to force a gas cylinder down against a needle tube puncturing the gas cylinder and inflating the balloon. An incapacitated person would not easily be able to operate the device.

McNeill, U.S. Pat. No. 3,941,079 discloses a balloon which is reusable, rugged and has relative long life. It is obviously not a device which could be carried about by a child nor easily operated by a child or an incapacitated person.

The above references and Chetlan, U.S. Pat. No. 2,646,019; Crofford, U.S. Pat. No. 827,350; Paulson, U.S. Pat. No. 1,836,495; Leslie, U.S. Pat. No. 2,395,006; Hansen U.S. Pat. No. 2,629,115; Sanwal, U.S. Pat. No. 2,842,090; Walker, U.S. Pat. No. 2,862,531; Hanson, U.S. Pat., No. 3,154,050; Pritchard, U.S. Pat. No. 3,187,712; Rozzella, U.S. Pat. No. 3,381,655; Clinger U.S. Pat. No. 3,727,229; Lutz, U.S. Pat. No. 3,735,723; and Collins, U.S. Pat. No. 3,796,181 cannot withstand any wind without being driven to the ground. MacFadden, U.S. Pat. No. 3,395,877 recognized the problem of adverse flight conditions and disclosed an air duct as a stabilizer on the tail portion of an inflatable device.

The nearest representative art is U.S. Pat. No. 4,800,835 (1989) ("'835") to Mears. It discloses a compact unit having a deflated airfoil which upon pulling a release key causes an integrated gas cylinder to discharge filling the airfoil. Once inflated, the airfoil rises to a height allowed by an attached tether to provide rescue location information. Mears '835 comprises a complex inflation system which is greatly simplified in the present invention. Mears '835 relies on a spring/plunger system to operate on a lever. The plunger then is activated by a spring activated or released by the release of a retaining pin. The plunger acts on a lever which, in turn, drives a puncture means into a gas cylinder thereby releasing the gas to the airfoil.

What is needed in the art is an invention which accomplishes the inflation of the airfoil and consequent deployment of a locator airfoil in a simple manner. What is needed in the art is an invention that punctures a gas cylinder containing inert gas with the simple twist of a valve mounted on the gas cylinder. The present invention comprises a valve having a puncture means which when tarred by a user punctures the gas cylinder.

What is also needed is an invention which comprises a simplified quick-release assembly to allow inflation and release of the airfoil in a controlled manner. The present invention has a quick-release assembly consisting of a quick-release mechanism having an airfoil connection. The quick-release assembly allows the airfoil to be inflated fully. It is then automatically released to ascend by the inflated airfoil pulling a pin to release the quick-release assembly. The quick-release mechanism disengages from the airfoil connection. The airfoil connection stays with the airfoil as it rises. This design is an improvement over to Mears '835 which simply causes the airfoil to fill with gas until the buoyant force of the gas is sufficient to cause the airfoil to separate from the cylinder. A side wind could easily cause the Mears '835 device to snag in a nearby tree as it drifted off the cylinder. Also, and incomplete filling can cause the device not to reach maximum altitude.

SUMMARY OF THE INVENTION

The main aspect of the present invention is to provide a deployable locator device having an inflatable balloon.

Another aspect of the present invention is to provide a locator device which is compact when not deployed.

Another aspect of the present invention is to provide a locator device having a quick-release assembly whereby a balloon may be automatically released once it is filled with gas.

Another aspect of the present invention is to provide a locator device having a simple puncture valve means to puncture a gas cylinder.

Another aspect of the present invention is to provide a locator device which contains an airfoil tether on a spool attached to the gas cylinder.

Another aspect of the present invention is to provide a locator device which can be easily deployed.

Other aspects of this invention will appear from the following description and appended claims, reference being made to the accompanying drawings forming a part of this specification wherein like reference characters designate corresponding parts in the several views.

The present invention comprises a compact case containing the deployable personal locator device. A tubular case comprises two halves. The tubular case is preferably made of metal or plastic. Contained within the two case halves is a gas cylinder. The gas cylinder contains an inert gas such as helium. One end of the gas cylinder is threaded. Attached to the threaded end is a threaded valve which has a puncture valve or needle at its center. The puncture valve has a pointed end resting on a puncture surface on the gas cylinder. Upon a turn of the threaded valve, the puncture valve punctures the gas cylinder. Typically, the turn of the valve necessary to puncture the gas cylinder is less than one full rotation. Once the gas cylinder is punctured, the inert gas flows through the puncture valve through a tube to the airfoil.

Contained within a circular enclosure of the valve is a coiled tether which is affixed at one end to the puncture valve and to the airfoil or balloon at the other. The puncture valve protrudes through the center of the tether coil/valve where it connects by the tube to the quick-release assembly. The quick release assembly comprises a quick-release mechanism and an airfoil connection. The quick-release mechanism comprises a tube. Attached normal to the tube is a flexable hinge. Attached to the flexible hinge is a latch. The airfoil connection is also a tube having a tab normal to the tube. The tab has a hole for a pin. Two other tabs extend normally to the tube axially aligned with the tab having the hole.

The tube for the quick-release mechanism slidingly inserts into the airfoil connection tube. The flexible hinge is then flexed 90 degrees to make it parallel to the tube thereby allowing the latch to fit between the tabs on the airfoil connection. The pin is then inserted into the airfoil connection tab thereby releasably retaining the latch between the tabs. A cord attached to the pin is attached at the other end to the airfoil. It is of such a length that when the airfoil is deflated, the length of the cord is sufficient to allow the pin to remain inserted in the tab.

In operation, the valve is turned to puncture the gas cylinder and initiate the inert gas flow. The airfoil or balloon receives the inert gas until it is full. A one-way valve known in the art allows the gas to flow into the airfoil. The one-way valve prevents the gas from escaping from the airfoil. Once full, the inflated shape of the airfoil causes the cord to remove the pin in the quick-release assembly. This is accomplished by the inflated shape of the airfoil pulling the cord around the pin. This results in the pin being pulled from the tab thereby releasing the latch. Operation in this manner of the quick-release assembly allows the airfoil to be fully inflated prior to release. Release of the airfoil before full inflation is not desirable since this may result in insufficient buoyancy preventing the airfoil from achieving full height. This would then result in less than full visibility of the deployed airfoil.

Once released, the balloon or airfiol ascends to the full length or height of the tether conected to the balloon. The tether may be 200 feet in length or longer. The airfoil may have a radar beam reflective coating of metalized polymer such as microfoil

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
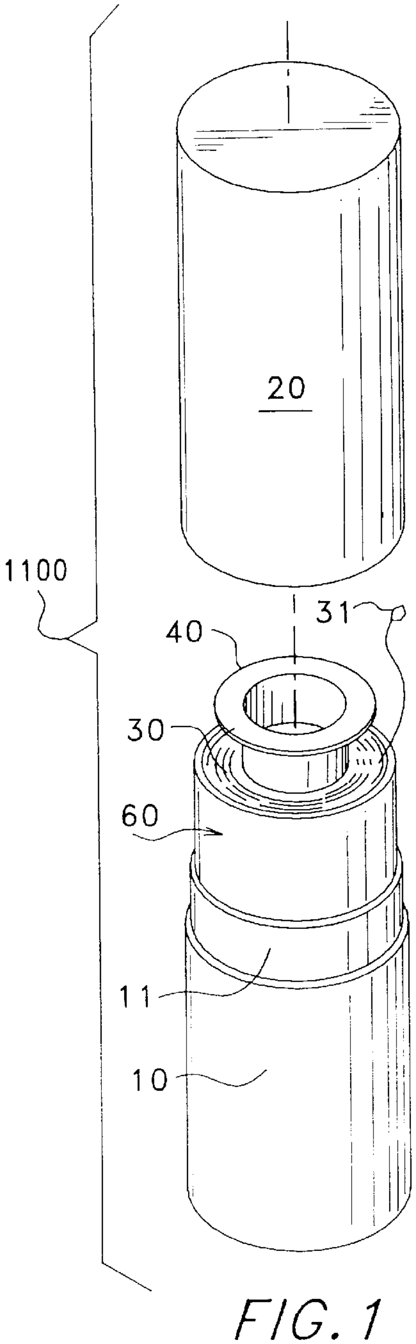
FIG. 1 is a top perspective view of the preferred embodiment.

FIG. 1 depicts a perspective view of the invention 100, the preferred embodiment. A top case 20 and bottom case 10 house the working parts of the invention. The two case halves 10, 20 mate together at surface 11. Contained within lower case 10 is gas cylinder 50, valve 60, and puncture valve 70. Contained within valve 60 is tether 30. Tether 30 is shown in the shape of a coil for ease of storage and deployment of tether 30. Tether 30 is secured to valve 60 by end 32. Tether end 31 is secured to the balloon or airfoil 100 at connection 101 shown in FIG. 3. Guide 40 is inserted into the center of the coil of tether 30. Guide 40 prevents tether 30 from tangling as it "plays out" during deployment. Tether 30 may be up to 400 feet in length. During storage and transport, top case 20 and bottom case 10 are connected together by a friction fit. All of the elements of the invention are contained within the case halves for ease of storage and portability. The container 1100 is opened by the user simply by pulling the top case 20 and bottom case 10 apart to allow access to the valve 60.

Figure 2:
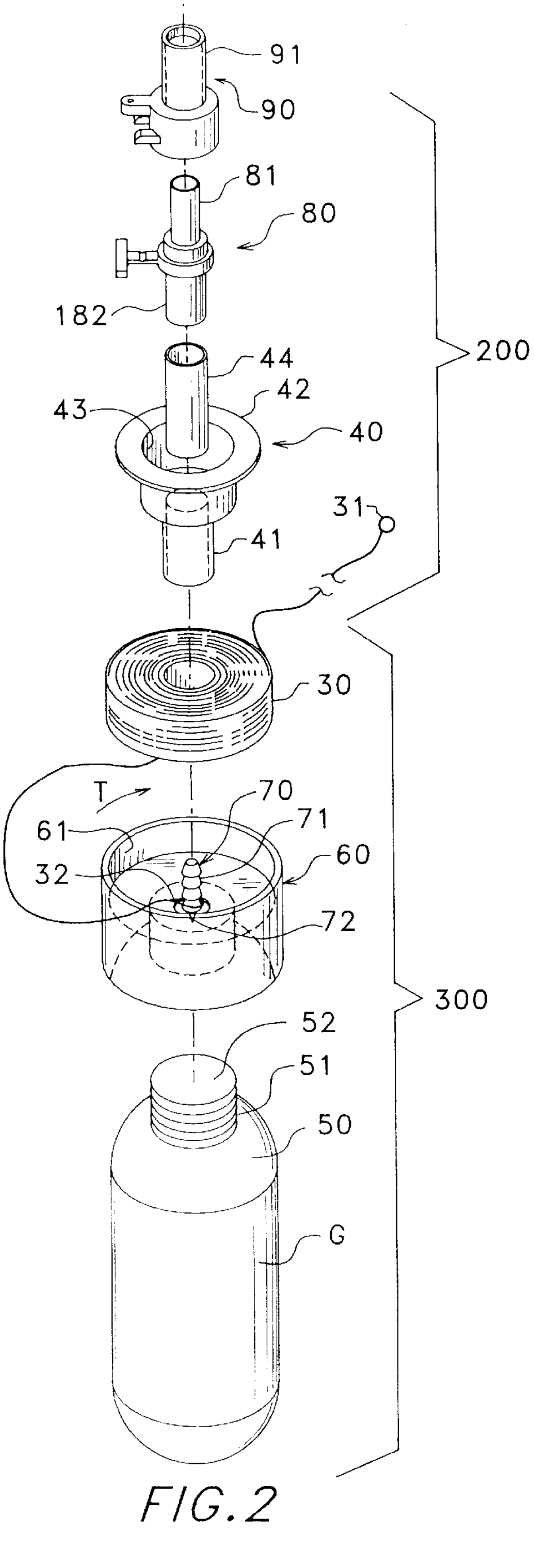
FIG. 2 is an exploded view of a portion of the embodiment shown in FIG. 1.

FIG. 2 is an exploded view of a portion of the invention. Subassembly 300 comprises tether 30 and puncture valve 70, valve 60 and gas cylinder 50. Valve is threadably attached to end 51 of gas cylinder 50. Puncture valve 70 is affixed to the center of valve 60. Puncture valve 70 may also comprise a puncture needle. Valve 60 is threaded onto end 51 until pointed end 72 of puncture valve 70 just contacts but does not penetrate surface 52. In operation, valve 60 is turned by a user in direction T sufficient to cause pointed end 72 to puncture surface 52 thereby allowing the pressurized inert gas G to flow through puncture valve 70. Tether 30 is coiled in such a manner so as to be contained within cavity 61 of valve 60. End 32 of tether 30 is attached to puncture valve 70 at connection 63. Guide 40 is inserted into the center of the tether 30 coil by tube 41. Tube 44 connects puncture valve 70 to quick-release mechanism 80 at end 82. Flange 42 is of a lesser diameter than tether 30 thereby allowing tether 30 to "play out" around guide flange 42 during deployment. Quick-release mechanism 80 is contained within the interior of guide 40. Quick-release mechanism 80 and airfoil connection 90 comprise the quick-release assembly 200. Airfoil connection 90 is releasably connected to quick-release mechanism 80. Airfoil 100 is attached to tube 91.

Figure 3:
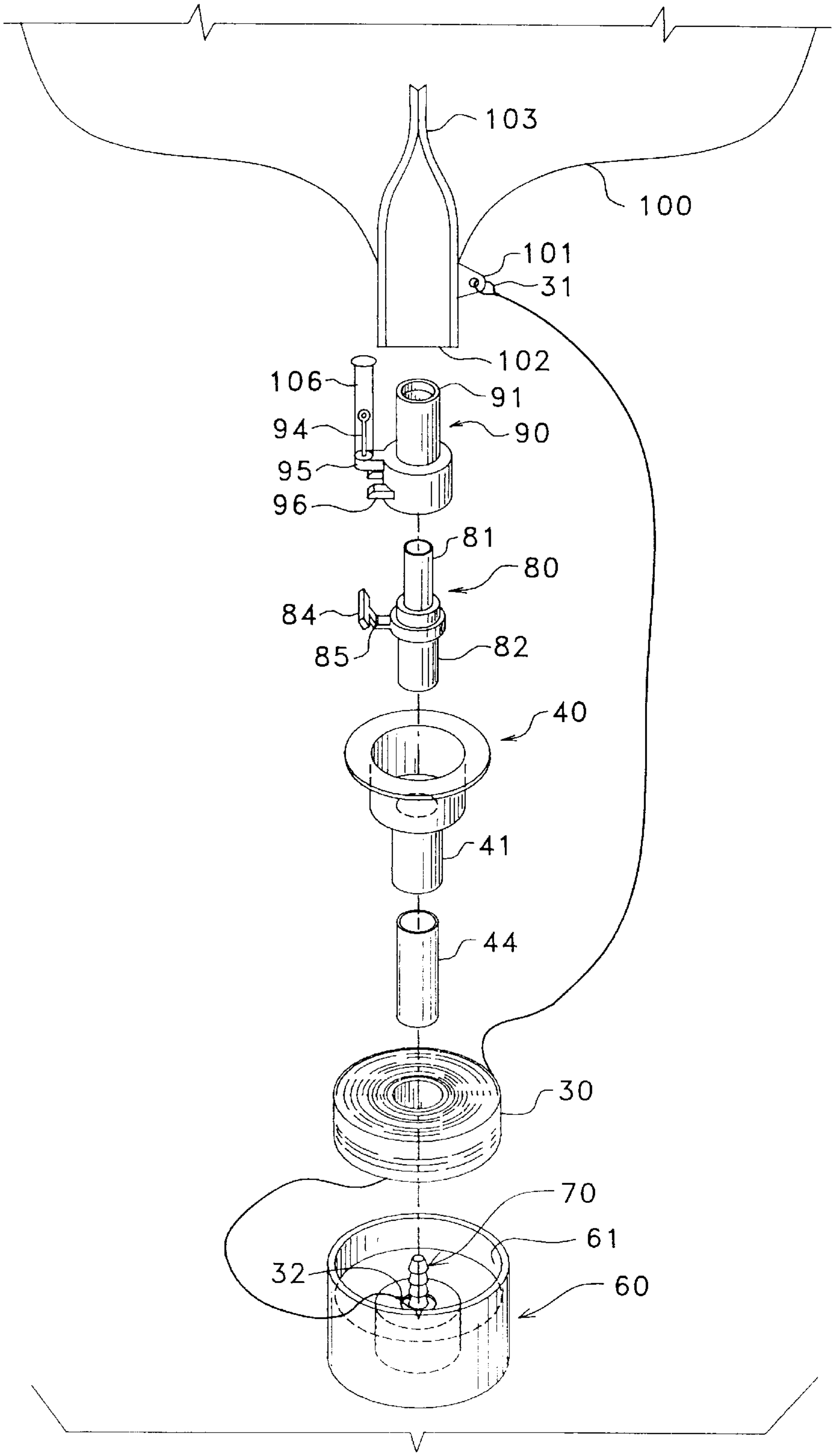
FIG. 3 is an exploded view of release mechanism components.

FIG. 3 is an exploded view of the components from the puncture valve to the airfoil. Subassembly 400 comprises the components from the valve 60 to airfoil 100, excluding the gas cylinder 50. Valve 60 has puncture valve 70 attached to its center. Cavity 61 receives the coiled tether 30. End 32 of tether 30 is attached to puncture valve 70. This securely fastens the tether to the deployed airfoil or balloon to a sufficient weight or anchor, in this case, the relatively heavy gas cylinder 50. End 31 of Fill tube 44 connects to puncture valve 70 over serrated surface 71. Guide tube 41 slides on the outside of fill tube 44 and within the coil of tether 30. Tube 82 of quick-release mechanism 80 has an interference fit within fill tube 44 so tube 82 is firmly affixed. Airfoil connection 90 releasably slides over tube 81 from quick-release mechanism 80. Opening 102 of airfoil 100 fits over tube 91 of airfoil connection 90. Once the airfoil is full of inert gas, one way valve 103 closes preventing loss of the inert gas upon release of airfoil connection 90. One way valve 103 is well known in the art.

Figure 4:
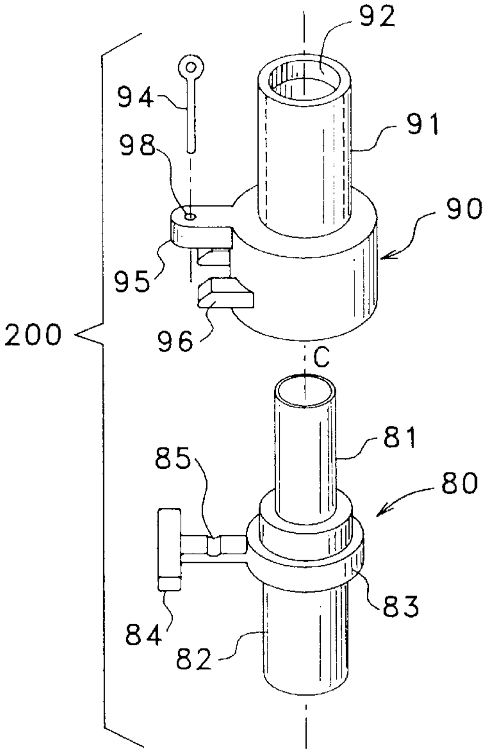
FIG. 4 is an exploded perspective view of the quick-release assembly.

FIG. 4 is an exploded perspective view of the quick-release assembly 200. Pin 94 slidingly fits through hole 98 in tab 95 on airfoil connection 90. Latch 84 on quick-release mechanism 80 slidingly fits between tab 95 and tabs 96 when flexible hinge 85 is folded at 90 degrees to the centerline C of quick-release mechanism 80. It is depicted in FIG. 4 in the released mode.

Figure 5:
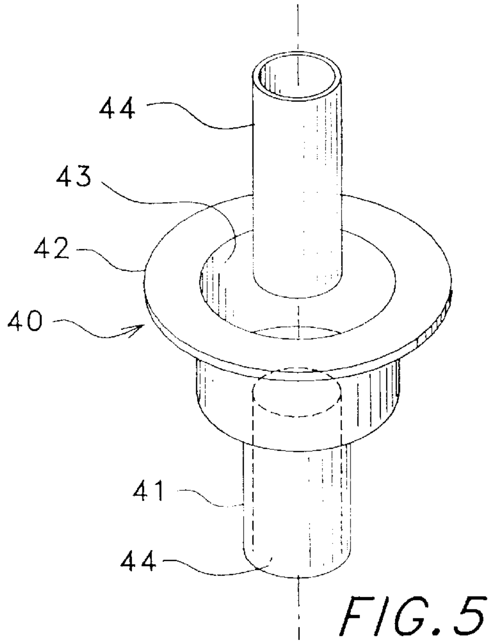
FIG. 5 is a perspective view of guide.

FIG. 5 is a perspective view of guide 40. Flange 42 is of a diameter less than the diameter of tether 30 so as to allow tether 30 to play out as the airfoil 100 is deployed. Quick-release mechanism 80 is contained within cavity 43. Tube 41 fits inside the coil of tether 30.

Figure 6:
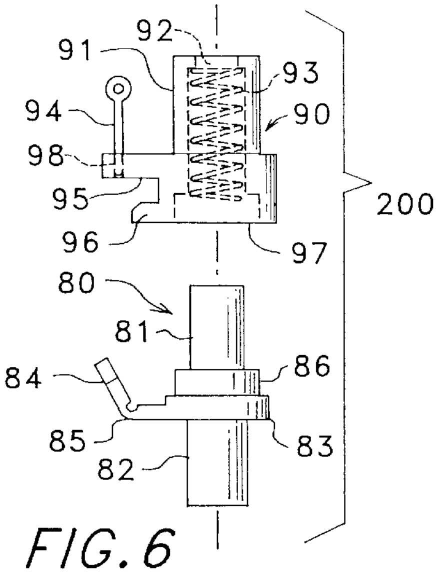
FIG. 6 is a side cut-away view of the quick-release assembly.

FIG. 6 depicts a side cut-away view of quick-release assembly 200. Spring 93 is contained within tube 91. Tube 81 slidingly fits within tube 91. Shoulder 86 fits within recess 94. Latch 84 fits between tab 95 and tab 96.

Figure 7:
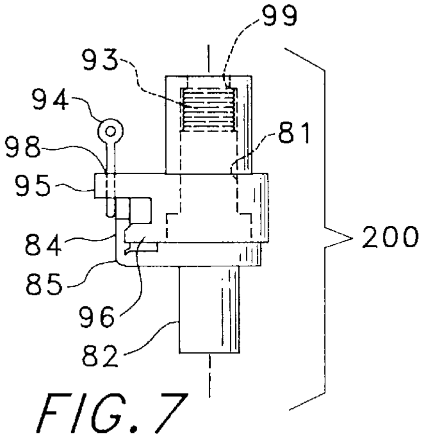
FIG. 7 is a side cut-away view of the quick-release assembly.

FIG. 7 depicts a side cut-away view of the quick-release assembly 200. Quick-release mechanism 80 is shown fully inserted into airfoil connection 90. Spring 93 is compressed within tube 91 against shoulder 99 and tube 81. Pin 94 is sufficiently inserted into hole 98 to capture latch 84 between tab 95 and tabs 96. Flexible hinge 85 is shown flexed 90 degrees to the centerline of the quick-release assembly 200.

Figure 8:
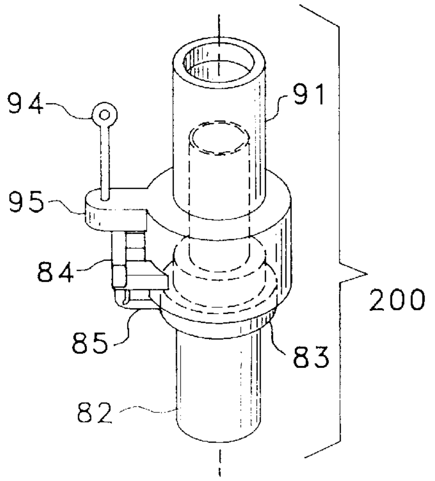
FIG. 8 is a cut-away perspective view of the quick-release assembly.

FIG. 8 depicts a cut-away perspective view of quick-release assembly 200 as described in FIG. 7.

Figure 9:
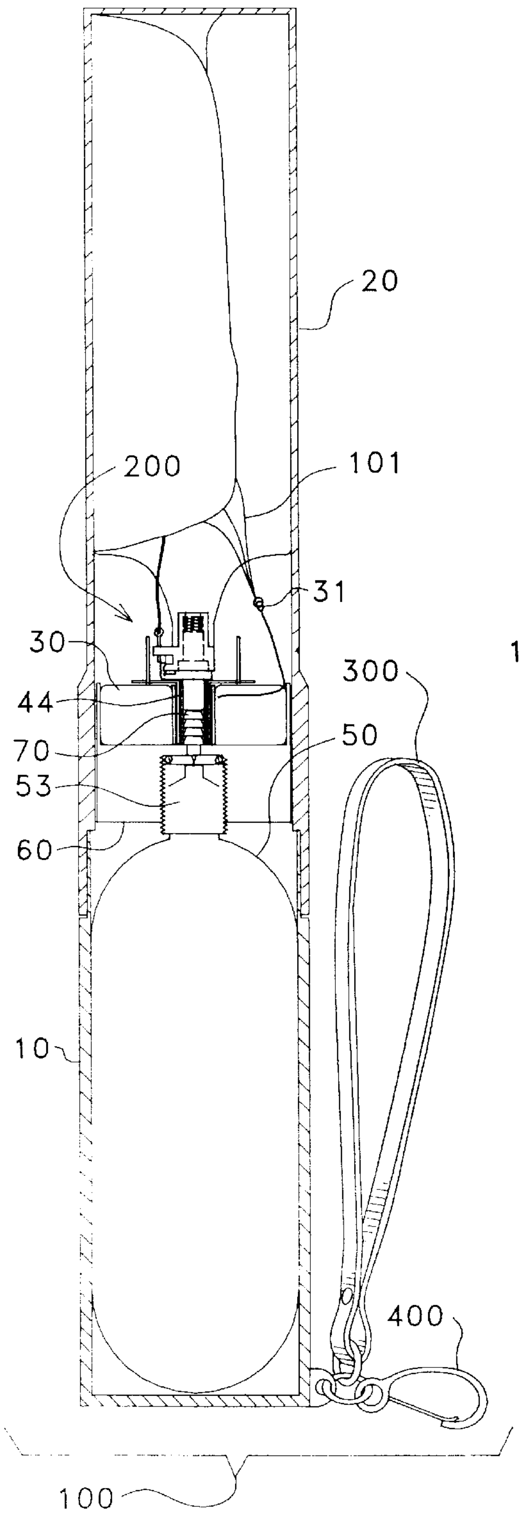
FIG. 9 is a cut-away view of the invention before deployment.

FIG. 9 is a cut-away view of the invention 100 before deployment. Gas cylinder 50 is contained within bottom case 10. Valve 60 is threadably attached to gas cylinder 50 at end 53. Puncture valve 70 is connected to valve 60. Tether 30 is coiled within valve 60. Quick-release assembly 200 is attached to puncture valve 70 by tube 44. Airfoil 100 is shown folded and deflated within upper case 20. Airfoil 100 is attached to tether 30 at end 32. Wrist-loop 300 or D-ring 400 are used for ease of carrying the invention.

Figure 10:
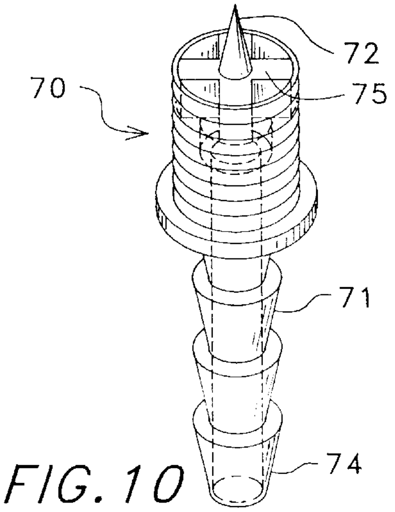
FIG. 10 is a perspective cut-away view of the puncture valve.

FIG. 10 is a side cut-away view of the puncture valve 170. Tube 74 runs the axial length of the valve. Serrated surface 71 is the means by which tube 44 is attached to puncture valve 70. Pointed end 72 is the means by which surface 52 of gas cylinder 50 is punctured. Bracket 75 positions pointed end 72 on the centerline of the puncture valve 70. The "+" shape of bracket 75 allows the gas to flow around the pointed end and through the puncture valve tube 74 enroute to the airfoil 100 once the surface 52 is punctured.

Figure 11:
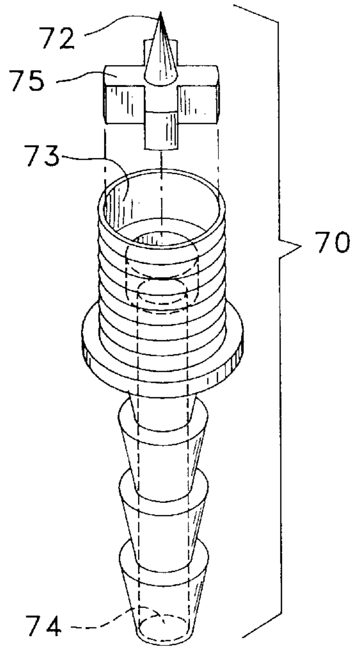
FIG. 11 is an exploded perspective view of the puncture valve.

FIG. 11 depicts an exploded perspective view of puncture valve 70. Bracket 75 is shown inserted into cavity 73 which communicates with tube 74.

Figure 12:
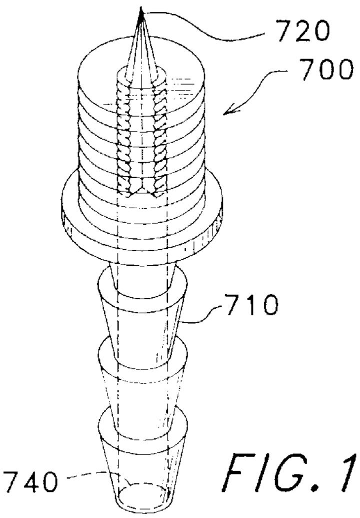
FIG. 12 is a perspective cut-away view of an alternate embodiment.

FIG. 12 depicts a perspective cut-away view of an alternate embodiment of puncture valve 700. Threaded point 720 is threadably inserted into threaded tube 730. A portion of point 720 is removed along a major axis. Slot 770 allows the gas to flow from the punctured surface 52 through tube 740.

Figure 13:
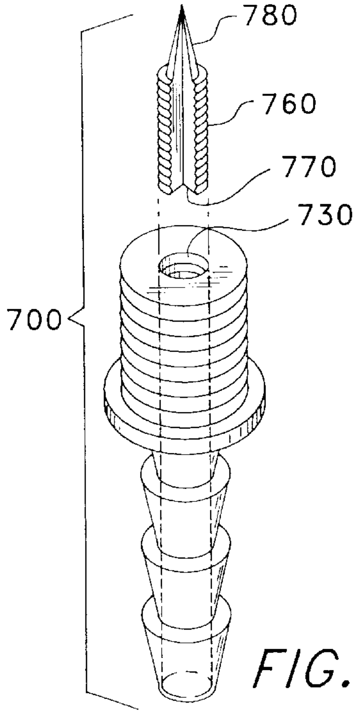
FIG. 13 is an exploded perspective view of an alternate embodiment.

FIG. 13 depicts an exploded perspective view of the alternate embodiment of puncture valve 700. Threads 760 are used to insert the pointed end 780 into tube 740 at threads 730. Slot 770 allows the gas to flow past the point 780.

Figure 14:
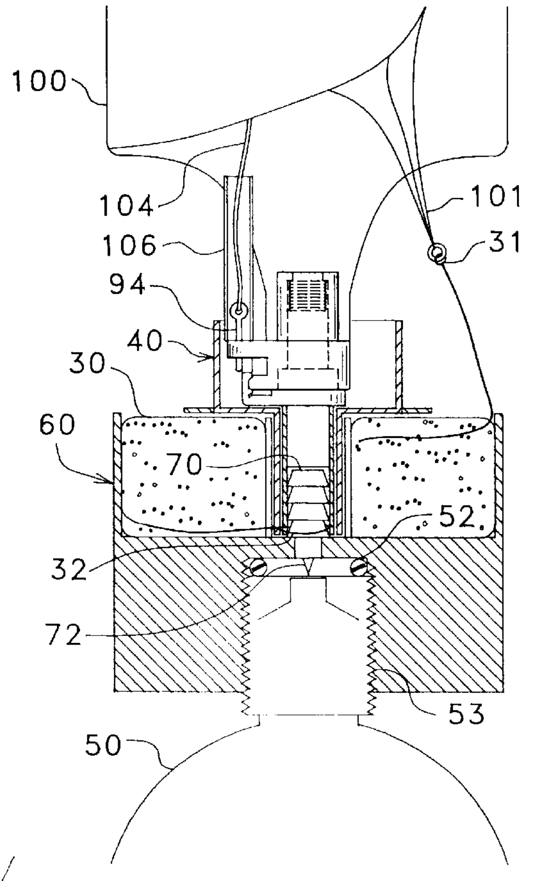
FIG. 14 is a cross-section view of the valve area.

FIG. 14 depicts a cross-section view of the valve area. Valve 60 is threadably connected to gas cylinder 50. Gas cylinder 50 has one end with threads 53 and puncture surface 52. Pointed end 72 of puncture valve 70 is shown engaging puncture surface 52. Tether 30 is contained within valve 60. End 32 is tied around puncture valve 70. End 31 is affixed to airfoil 100 at connection 101. Cord 104 is attached to pin 94 through tube 106.

Figure 15:
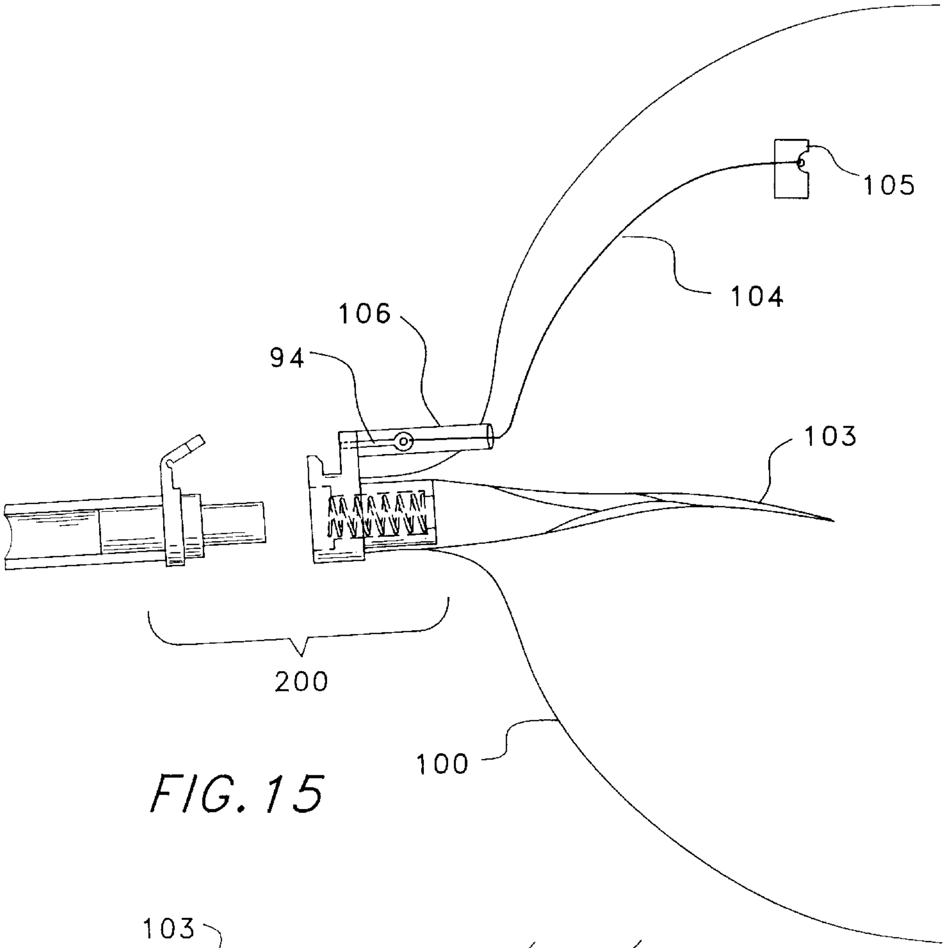
FIG. 15 is a cross-section view of the quick-release assembly with the airfoil.

FIG. 15 depicts a cross-section view of the quick-release assembly with the airfoil. Airfoil 100 is attached to quick-release assembly 200. Contained within airfoil 100 is one-way valve 103. One-way valve 103 is known in the art. Cord 104 is attached to pin 94 through tube 106. Cord 104 is attached to airfoil 100 at connection 105. The operation of cord 104 is described in FIG. 17.

Figure 16A:
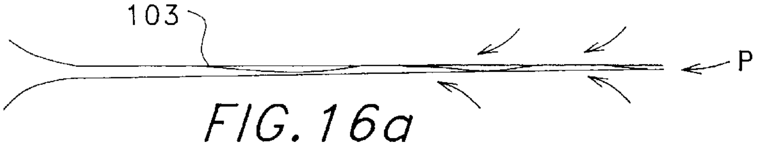
FIG. 16 is a cross-section viewed of the one-way valve.
Figure 16B:
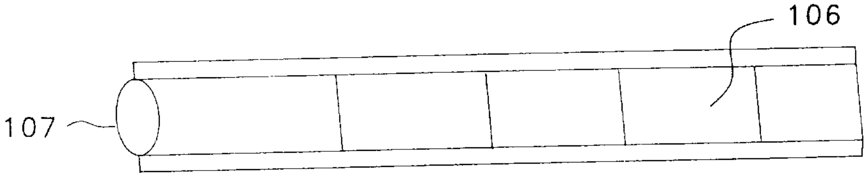
Figure 16C:
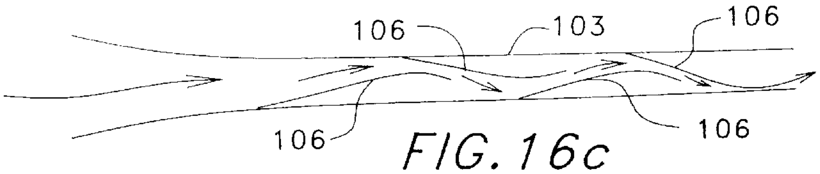

FIG. 16 depicts a cross- section view of the one-way valve. Vanes 106 overlap and are flexible so as to open into the position (c) as gas flows through the valve. Once the gas flow stops, the flexible valve vanes are pressed together (a) by pressure "P" within the airfoil sufficiently to seal the aperture 107.

Figure 17:
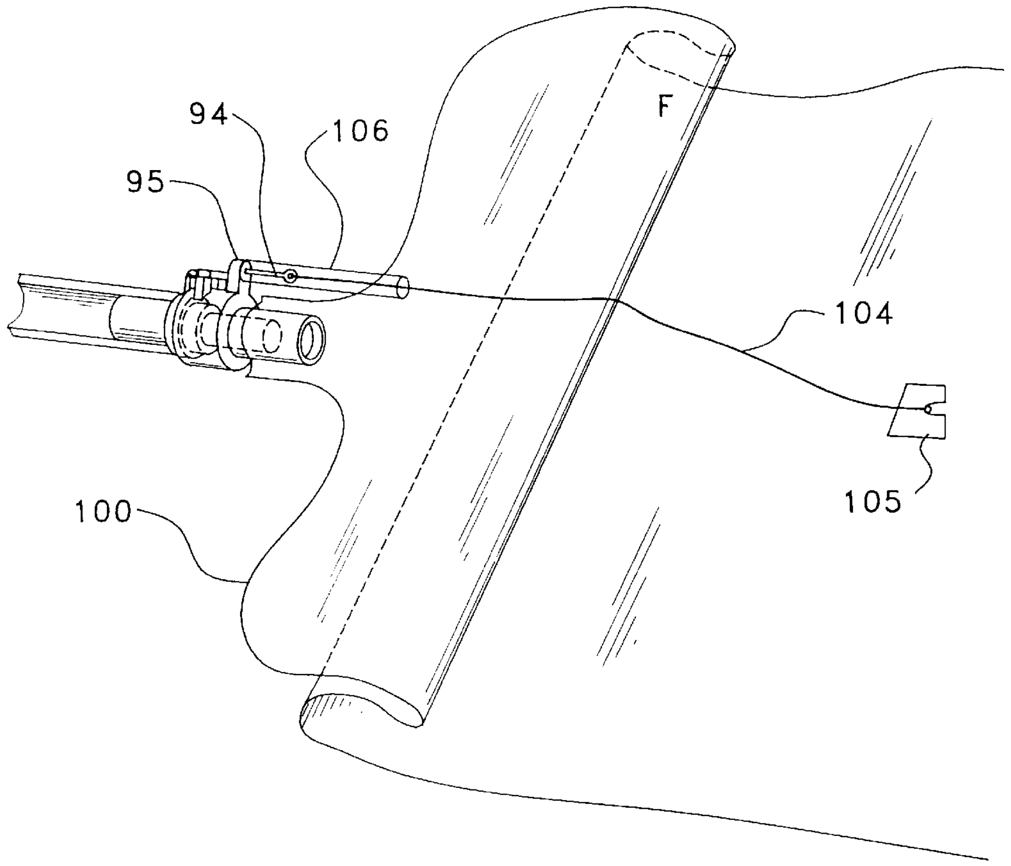
FIG. 17 is the release pin arrangement on the airfoil.

A side view of the vanes 106 is shown in (b) FIG. 17 depicts the release pin arrangement on the airfoil. Prior to release, as shown, cord 104 is attached to airfoil 100 at connection 105. Cord 104 is also connected to pin 94. Cord 104 is routed through tube 106. The airfoil 100 is folded at "F" to cause the distance for connection 105 to pin 94 to equal the length of cord 104. Upon deployment, as gas flows into airfoit 100, the expansion of the airfoil 100 causes the fold "F" to be unfolded. This causes the distance between pin 94 and connection 105 to increase. This, In turn, causes the expansion of the airfoil to pull on cord 104 ultimately pulling pin 94 from tab 95. This allows quick release assembly 200 to operate as described in FIG. 7 thereby releasing the fully inflated airfoil for flight.

Figure 18:
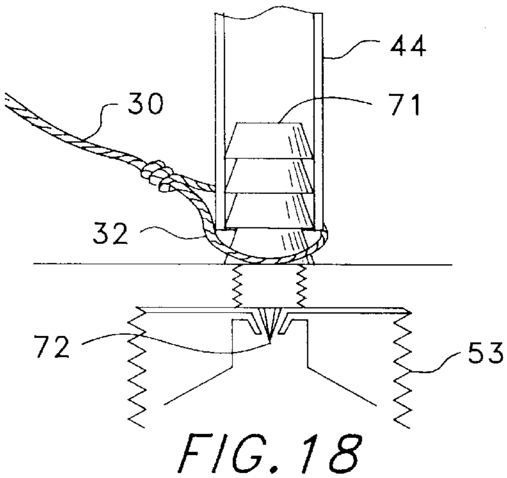
FIG. 18 is a cross-section of the tether secured to the puncture valve.

FIG. 18 depicts a cross-section view of the tether secured to the puncture valve. End 32 is affixed about serrated surface 71 of puncture valve 70. It is also held in place by tube 44.

Figure 19:
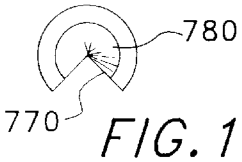
FIG. 19 is a top view of the puncture valve.

FIG. 19 is a top view of puncture valve 780 as depicted in FIG. 13.

Figure 20:
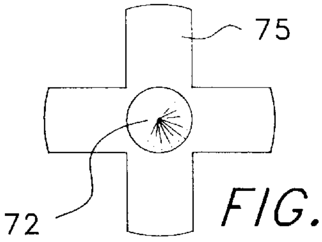
FIG. 20 is a top view of the bracket for the puncture valve.

FIG. 20 is a top view of the puncture valve bracket 75 as depicted in FIG. 11.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A locator device comprising:

a container having a top case connected to a bottom case;

said bottom case having a cylinder of compressed gas;

an airfoil having a deflated mode;

a puncture valve attached to said cylinder;

a tether located above the puncture valve with one end affixed to said container and the other end affixed to said airfoil;

a mechanical quick-release assembly having a connection to said airfoil;

whereby said puncture valve is activated by a user thereby causing a gas to inflate said airfoil to a maximal inflated mode, said quick release assembly having an automatic activation to release said airfoil to rise with the tether;

said quick-release assembly comprising:

(a) a tab connected to said airfoil, said tab describing a hole into which a removable pin is insertable; and (b) a quick-release mechanism having a latch for connection with said tab, said pin being insertable through said tab to releasably connect said quick-release mechanism to said tab such that removal of the pin from the hole in the tab releases the latch from the tab to permit the airfoil to rise, said removable pin being connected to said airfoil by a cord, said cord being of a length that inflation of said airfoil will result in movement of said pin out from said hole in said tab, thus permitting the airfoil to rise.

2. The locator device of claim 1, wherein said quick-release assembly further comprises an airfoil connection tube with an outer surface, said tab being connected to said outer surface, said quick-release mechanism having a tube which slidingly fits within said airfoil connection tube, said latch having a hinged connection to said tube of said quick-release mechanism.

3. The locator device of claim 2, wherein said airfoil connection tube further comprises a spring contained within said airfoil connection tube which forcibly separates said airfoil connection tube from said quick-release mechanism upon deployment of said airfoil.

4. The locator device of claim 3, wherein said gas is lighter than air.

5. The locator device of claim 4, wherein said puncture valve comprises a puncture needle comprising a tube having a point at one end to puncture said cylinder.

6. The locator device of claim 5, wherein said tether has a coiled mode stored above said puncture valve.

7. The locator device of claim 6, wherein said airfoil further comprises a metalized polymer layer for detection by a radar beam.

8. The locator device of claim 7, wherein said puncture valve is threadably connected to said cylinder.

9. The locator device of claim 8, wherein said container is tubular.

10. The locator device of claim 9 further comprising control guide hosing said tether, thereby allowing said tether to controllably spool out during deployment of said airfoil.

11. The locator device of claim 10, wherein said puncture needle further comprises a threaded point having a longitudinal slot whereby said gas may flow along the length of said threaded point.

12. The locator device of claim 4, wherein said gas comprises helium.

13. The locator device of claim 12, wherein said airfoil further comprises a one-way valve whereby said gas is sealed within said airfoil upon inflation.

14. The locator device of claim 13, wherein said tether has a length of about 400 feet.

15. A method of deploying a personal locator device comprising the steps of:

forming a container having a top case connected to a bottom case;

storing in said bottom case a cylinder of compressed gas;

attaching a puncture valve to said cylinder;

storing an airfoil in a deflated mode within said container;

affixing an end of a tether to said container and affixing the other end to said airfoil;

connecting a mechanical quick-release assembly to the airfoil in the deflated mode, said quick release assembly having an automatic activation to release said airfoil to rise with the tether, said quick-release assembly comprising (a) a tab connected to said airfoil, said tab describing a hole into which a removable pin is inserted; and (b) a quick-release mechanism having a latch connected with said tab, said pin releasably connecting said quick-release mechanism to said tab such that removal of the pin from the hole in the tab releases the latch from the tab to permit the airfoil to rise, said removable pin being connected to said airfoil by a cord, said cord being of a length that inflation of said airfoil will result in movement of said pin out from said hole in said tab, thus permitting the airfoil to rise; and activating said puncture valve to puncture said cylinder, thereby inflating said airfoil to a maximal inflated mode, and thereby automatically activating said quick release-assembly releasing said airfoil to rise while affixed to said tether.

16. A locator device comprising:

a container having a top case connected to a bottom case;

said bottom case having a compressed gas storage means;

a valve attached to said compressed gas storage means and having a puncture needle;

a tether with one end affixed to said container and the other end affixed to an inflatable airfoil;

a quick-release assembly having a connection to the airfoil, said airfoil being stored within said container in a deflated mode;

whereby said valve is activated by a user causing said puncture needle to puncture said compressed gas storage means thereby causing a gas to inflate said airfoil to a maximal inflated mode, thereby mechanically and automatically activating said quick release assembly which releases said airfoil to rise wile affixed to the tether;

said quick-release assembly comprising:

(a) a tab connected to said airfoil, said tab describing a hole into which a removable pin is insertable; and (b) a quick-release mechanism having a latch for connection with said tab, said pin being insertable through said tab to releasably connect said quick-release mechanism to said tab such that removal of the pin from the hole in the tab releases the latch from the tab to permit the airfoil to rise, said removable pin being connected to said airfoil by a cord, said cord being of a length that inflation of said airfoil will result in movement of said pin out from said hole in said tab, thus permitting the airfoil to rise.

17. The locator device of claim 16, wherein said quick-release assembly further comprises an airfoil connection tube with an outer surface, said tab being connected to said outer surface, said quick-release mechanism having a tube which slidingly fits within said airfoil connection tube, said latch having a hinged connection to said tube of said quick-release mechanism.

18. The locator device of claim 17, wherein said airfoil connection tube further comprises a spring contained within said airfoil connection tube which forcibly separates said airfoil connection tube from said quick-release mechanism upon deployment of said airfoil.

19. The locator device of claim 18, wherein said gas is lighter than air.

20. The locator device of claim 19, wherein said airfoil further comprises a metalized polymer layer for detection by a radar beam.

21. A locator device comprising:

a container having a top case connected to a bottom case;

said bottom case having a cylinder of compressed gas;

an airfoil having a deflated mode;

a puncture valve attached to said cylinder;

a tether located above the puncture valve with one and affixed to said container and the other end affixed to said airfoil;

a quick-release assembly having a connection to said airfoil;

said quick-release assembly comprising an airfoil connection tube with an outer surface and a tab extending normal to said outer surface, said tab further describing a hole into which a removable pin is inserted;

a quick-release mechanism having a latch connected to a tube which slidingly fits within said airfoil connection tube, whereby said latch is in connection with said tab, and whereby said pin is inserted through said tab to releasably connect said quick-release mechanism to said airfoil connection;

said latch having a hinged connection to said tube of said quick release mechanism;

said removable pin being attached to said airfoil; and whereby said puncture valve is activated by a user, thereby causing a gas to inflate said airfoil to a maximal inflated mode, which activates said quick-release assembly releasing said airfoil to rise with the tether.

* * * * *